United States Patent
Beavin et al.

(10) Patent No.: US 11,030,193 B2
(45) Date of Patent: *Jun. 8, 2021

(54) SUBQUERY PREDICATE GENERATION TO REDUCE PROCESSING IN A MULTI-TABLE JOIN

(71) Applicant: International Business Machines Corporation, Armonk, NY (US)

(72) Inventors: Thomas A. Beavin, Milpitas, CA (US); Andrei F. Lurie, San Jose, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,713

(22) Filed: Nov. 20, 2018

(65) Prior Publication Data

US 2019/0087460 A1 Mar. 21, 2019

Related U.S. Application Data

(63) Continuation of application No. 15/471,985, filed on Mar. 28, 2017.

(51) Int. Cl.
*G06F 16/2453* (2019.01)
(52) U.S. Cl.
CPC .. *G06F 16/24537* (2019.01); *G06F 16/24535* (2019.01)
(58) Field of Classification Search
USPC ........................................................ 707/714
See application file for complete search history.

(56) References Cited

U.S. PATENT DOCUMENTS 6,529,896 B1 * 3/2003 Leung et al. ........... G06F 17/30
707/999.002
6,882,993 B1 * 4/2005 Lawande et al. ....... G06F 17/30
707/714

(Continued)

OTHER PUBLICATIONS

Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Muluemebet Gurmu
(74) *Attorney, Agent, or Firm* — Konrad Raynes Davda & Victor LLP; Janaki K. Davda

(57) ABSTRACT

Provided are techniques for efficient subquery predicate generation to reduce processing in a multi-table join. It is determined that a query is to be rewritten, wherein the query includes a predicate for a first column of a first table and a second column of a second table. The query is rewritten with generated subquery predicates for the first table that are to be applied to the second table and with generated subquery predicates for the second table that are to be applied to the first table. Minimum and maximum ranges for columns of the generated subquery predicates at a cursor open are determined. The minimum and maximum ranges are merged to determine inclusive ranges that exist in the first table and the second table. The generated subquery predicates are rewritten as derived local subquery predicates with the inclusive ranges. The query with the derived local subquery predicates is executed.

7 Claims, 20 Drawing Sheets

(56) References Cited

U.S. PATENT DOCUMENTS

| | | | |
|---|---|---|---|
| 7,953,726 B2 | 5/2011 | Purcell | |
| 9,378,243 B1 | 6/2016 | Korlapati et al. | |
| 2004/0220896 A1* | 11/2004 | Finlay et al. | G06F 17/30 707/999.001 |
| 2007/0226180 A1* | 9/2007 | Cheng | G06F 16/24539 |
| 2012/0191697 A1 | 7/2012 | Sherman et al. | |
| 2015/0178699 A1* | 6/2015 | Wada et al. | G06Q 20/14 705/40 |
| 2016/0350347 A1 | 12/2016 | Das et al. | |

OTHER PUBLICATIONS

Mell, P. and T. Grange, "The NIST Definition of Cloud Computing (Draft)", Sep. 2011, Computer Security Division Information Technology Laboratory National Institute of Standards and Technology, Total 7 pp.

U.S. Appl. No. 15/471,985, filed Mar. 28, 2017, pp. 56, (57.400).

Preliminary Amendment for U.S. Appl. No. 15/471,985, pp. 6, dated Nov. 20, 2018, (57.400).

List of IBM Patents or Patent Applications Treated as Related, Nov. 20, 2018, Total 2 pp.

Office Action 1 for U.S. Appl. No. 15/471,985, 28 pp., dated Oct. 31, 2019. [57.400 (OA1)].

Response to Office Action 1 for U.S. Appl. No. 15/471,985, 10 pp., dated Jan. 24, 2020. [57.400 (ROA1)].

Final Office Action 1 for U.S. Appl. No. 15/471,985, 25 pp., dated Apr. 23, 2020. [57.400 (FOA1)].

Response to Final Office Action 1 for U.S. Appl. No. 15/471,985, 13 pp., dated Jul. 23, 2020. [57.400 (RFOA1)].

Office Action 3 for U.S. Appl. No. 15/471,985, 24 pp., dated Oct. 2, 2020. [57.400 (OA3)].

Response to Office Action 3 for U.S. Appl. No. 15/471,985, 7 pp., dated Dec. 31, 2020. [57.400 (ROA3)].

Notice of Allowance 1 for U.S. Appl. No. 15/471,985, 13 pp., dated Feb. 9, 2021.

* cited by examiner

```
SELECT *
FROM T1, T2
WHERE T1.C1 = T2.C1
```

FIG. 2A

```
SELECT *
FROM T1, T2
WHERE T1.C1 = T2.C1

AND T1.C1 >= (SELECT MIN(C1) FROM T2)
AND T1.C1 <= (SELECT MAX(C1) FROM T2)

AND T2.C1 >= (SELECT MIN(C1) FROM T1)
AND T2.C1 <= (SELECT MAX(C1) FROM T1)
```

FIG. 2B

```
                                                      ┌─ 220
┌─────────────────────────────────┐
│ SELECT *                        │
│ FROM T1, T2                     │
│ WHERE T1.C1 = T2.C1             │
│                                 │
│ AND T1.C1 >=  50                │
│ AND T1.C1 <= 150                │
│                                 │
│ AND T2.C1 >= 1                  │
│ AND T2.C1 <= 100                │
└─────────────────────────────────┘
```

FIG. 2C

```
                                                      ┌─ 230
┌─────────────────────────────────┐
│ SELECT *                        │
│ FROM T1, T2                     │
│ WHERE T1.C1 = T2.C1             │
│                                 │
│ AND T1.C1 >=  50                │
│ AND T1.C1 <= 100                │
│                                 │
│ AND T2.C1 >= 50                 │
│ AND T2.C1 <= 100                │
└─────────────────────────────────┘
```

FIG. 2D

```
SELECT *
FROM T1, T2
WHERE T1.C1 = T2.C1
AND T1.C2 = 'A'
AND T2.C3 = 'B'
```

FIG. 3A

```
SELECT *
FROM T1, T2
WHERE T1.C1 = T2.C1
AND T1.C2 = 'A'
AND T2.C3 = 'B'

AND T1.C1 >= (SELECT MIN(C1) FROM T2 WHERE T2.C3 = 'B')
AND T1.C1 <= (SELECT MAX(C1) FROM T2 WHERE T2.C3 = 'B')

AND T2.C1 >= (SELECT MIN(C1) FROM T1 WHERE T1.C2 = 'A')
AND T2.C1 <= (SELECT MAX(C1) FROM T1 WHERE T1.C2 = 'A')
```

FIG. 3B

```
SELECT *
FROM T1, T2
WHERE T1.C1 = T2.C1
AND T1.C2 = 'A'
AND T2.C3 = 'B'

AND T1.C1 >= (SELECT MIN(C1) FROM T2 WHERE T2.C1 >= 50 AND T2.C3 = 'B')
AND T1.C1 <= (SELECT MAX(C1) FROM T2 WHERE T2.C1 <= 100 AND T2.C3 = 'B')

AND T2.C1 >= (SELECT MIN(C1) FROM T1 WHERE T1.C1 >= 50 AND T1.C2 = 'A')
AND T2.C1 <= (SELECT MAX(C1) FROM T1 WHERE T1.C1 <= 100 AND T1.C2 = 'A')
```

```
SELECT *
FROM T1, T2, T3
WHERE T1.C1 = T2.C1
AND T2.C2 = T3.C2
```

FIG. 4A

```
SELECT *
FROM T1, T2, T3
WHERE T1.C1 = T2.C1
AND T2.C2 = T3.C2

AND T1.C1 >= (SELECT MIN(C1) FROM T2)
AND T1.C1 <= (SELECT MAX(C1) FROM T2)

AND T2.C1 >= (SELECT MIN(C1) FROM T1)
AND T2.C1 <= (SELECT MAX(C1) FROM T1)

AND T2.C2 >= (SELECT MIN(C2) FROM T3)
AND T2.C2 <= (SELECT MAX(C2) FROM T3)

AND T3.C2 >= (SELECT MIN(C2) FROM T2)
AND T3.C2 <= (SELECT MAX(C2) FROM T2)
```

```
420
SELECT *
FROM T1, T2, T3
WHERE T1.C1 = T2.C1
AND T2.C2 = T3.C2

AND T1.C1 >= (SELECT MIN(C1) FROM T2)    → 1
AND T1.C1 <= (SELECT MAX(C1) FROM T2)    → 100

AND T2.C1 >= (SELECT MIN(C1) FROM T1)    → 50
AND T2.C1 <= (SELECT MAX(C1) FROM T1)    → 150

AND T2.C2 >= (SELECT MIN(C2) FROM T3)    → 'A'
AND T2.C2 <= (SELECT MAX(C2) FROM T3)    → 'X'

AND T3.C2 >= (SELECT MIN(C2) FROM T2)    → 'B'
AND T3.C2 <= (SELECT MAX(C2) FROM T2)    → 'Y'
```

```
430
SELECT *
FROM T1, T2, T3
WHERE T1.C1 = T2.C1
AND T2.C2 = T3.C2

AND T1.C1 >= (SELECT MIN(C1) FROM T2 WHERE C1 >= 50 AND
C2 BETWEEN 'B' AND 'X')
AND T1.C1 <= (SELECT MAX(C1) FROM T2 WHERE C1 <= 100 AND
C2 BETWEEN 'B' AND 'X')

AND T3.C2 >= (SELECT MIN(C2) FROM T2 WHERE C2 >= 'B' AND
C1 BETWEEN 50 AND 100)
AND T3.C2 <= (SELECT MAX(C2) FROM T2 WHERE C2 <= 'X' AND
C1 BETWEEN 50 AND 100)
```

FIG. 4D

```
SELECT *
FROM T1, T2
WHERE T1.C1 < T2.C1
```

FIG. 5A

```
SELECT *
FROM T1, T2
WHERE T1.C1 < T2.C1

AND T1.C1 < (SELECT MAX(T2.C1) FROM T2)
AND T2.C1 > (SELECT MIN(T1.C1) FROM T1)
```

FIG. 5B

```
SELECT *
FROM T4, T5
WHERE T4.C1 =T5.C1
    AND T4.C2 = T5.C2
```

FIG. 6A

```
SELECT *
FROM T4, T5
WHERE T4.C1 =T5.C1
    AND T4.C2 = T5.C2

AND (T5.C1, T5.C2) <= (SELECT C1, C2 FROM T4 ORDER BY C1, C2
DESC FETCH FIRST 1 ROW ONLY)
AND (T5.C1, T5.C2) >= (SELECT C1, C2 FROM T4 ORDER BY C1, C2
ASC FETCH FIRST 1 ROW ONLY)
```

FIG. 6B

```
SELECT *
FROM T4, T5
WHERE T4.C1 = T5.C1
    AND T4.C2 = T5.C2

AND T4.C1 >= (SELECT MIN(C1) FROM T5)
AND T4.C1 <= (SELECT MAX(C1) FROM T5)
AND T4.C2 >= (SELECT MIN(C2) FROM T5)
AND T4.C2 <= (SELECT MAX(C2) FROM T5)
AND T5.C1 >= (SELECT MIN(C1) FROM T4)
AND T5.C1 <= (SELECT MAX(C1) FROM T4)
AND T5.C2 >= (SELECT MIN(C2) FROM T4)
AND T5.C2 <= (SELECT MAX(C2) FROM T4)
```

FIG. 6C

```
SELECT *
FROM LOCALTABLE AS T1, CLOUDTABLE AS T2
WHERE T1.C1 = T2.C1
```

FIG. 7A

```
SELECT *
FROM LOCALTABLE AS T1, CLOUDTABLE AS T2
WHERE T1.C1 = T2.C1

AND T2.C1 >= (SELECT MIN(C1) FROM LOCALTABLE AS T1)
AND T2.C1 <= (SELECT MAX(C1) FROM LOCALTABLE AS T1)
```

FIG. 7B

```
SELECT *
FROM LOCALTABLE AS T1, CLOUDTABLE AS T2
WHERE T1.C1 = T2.C1
AND T2.C1 >= 1
AND T2.C1 <= 100
```
— 720

FIG. 7C

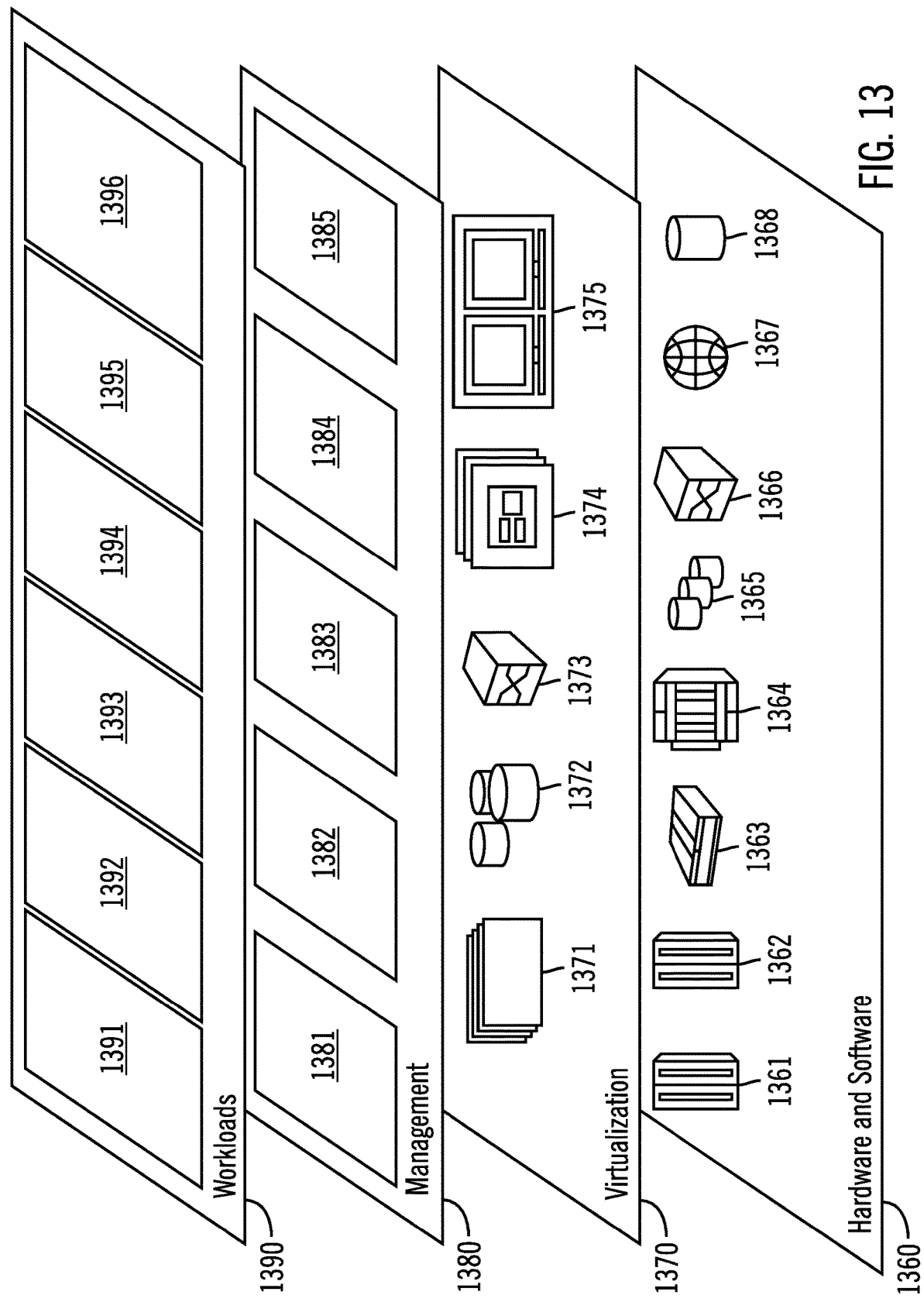

SUBQUERY PREDICATE GENERATION TO REDUCE PROCESSING IN A MULTI-TABLE JOIN

BACKGROUND

Embodiments of the invention relate to efficient subquery predicate generation to reduce processing in a multi-table join.

A DataBase Management System (DBMS) may use Structured Query Language (SQL) statements. The SQL statements have evolved into a standard language for DBMS software. The DBMS uses SQL statements for storing and retrieving data (result or result set) in a database. The database is organized into tables that consist of rows (also referred to as tuples or records) and columns (also referred to as fields or attributes) of data.

A table in a database may be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

A cost based query optimizer of the DBMS chooses an efficient access path to the data for a given SQL statement. For multi-table queries, it is often important that the join sequence matches the order of best to least filtering, given the table join relationships. Numerous other factors, such as available indexing and clustering of those indexes, and also the number of estimated rows from each plan step, may impact both the join sequence and also the join methods exploited by the query.

Accuracy of plan estimates is dependent on the inputs that allow the cost based query optimizer to differentiate choices for different access paths, some of which may not be known until execution, while other inputs may be difficult or expensive to collect. Accuracy is further challenged if the SQL statement involves objects at multiple sites ("nodes") including, but not limited to a local DBMS and a separate query accelerator, a cloud, or big data platform distributed file system objects. The emergence of big data platforms, such as the Apache® Hadoop® platform and the Apache® Spark platform, offer more opportunities for exploring analytics on data processed with a DBMS. (Apache and Hadoop are registered trademarks of the Apache Software Foundation in the United States and/or other countries.) In these cases, the type of information collected is unique to each implementation and, therefore, difficult for the cost based query optimizer to determine how best to optimize the SQL statement across disparate data sources.

Existing techniques provide predicate generation via transitive closure (e.g., if A=B and A=1, then B=1). Existing techniques provide generated predicates from scenarios where the entire data set is read, such as in sort, materialization or hashing.

Existing techniques provide predicate pushdown (copied from outer query block to lower levels). Existing techniques provide predicate bubbleup (copied from lower to higher level query blocks).

Existing techniques generate high/low key ranges for sort-merge and merge-scan join from the result of the sort for join and applying those as local subquery predicates to another table in the join.

Existing techniques generate subquery predicates from a materialized result. Such techniques may be applicable to any materialization, including sort for join or non-correlated subquery predicates.

Existing techniques provide hash join implementations to generate high/low subquery predicates from the hashed result to be applied to another table.

However, these existing techniques read all rows for sort or hashing to allow the high/low keys to be generated. Existing techniques provide a distributed cost based optimizer that applies to a relational database management system where information is shared from each site to another that allows the cost based optimizer to make decisions about which sites should process each part of the query and whether information is distributed to one site or another. However, this technique does not work if each site is not providing information that the cost based optimizer can consume. Such techniques do not generate subquery predicates.

SUMMARY

Provided is a method for efficient subquery predicate generation to reduce processing in a multi-table join. The method comprises: determining, with a processor of a computer, that a query is to be rewritten, where the query includes a predicate for a first column of a first table and a second column of a second table; rewriting the query with generated subquery predicates for the first table that are to be applied to the second table and with generated subquery predicates for the second table that are to be applied to the first table; determining minimum and maximum ranges for columns of the generated subquery predicates at a cursor open; merging the minimum and maximum ranges to determine inclusive ranges that exist in the first table and the second table; rewriting the generated subquery predicates as derived local subquery predicates with the inclusive ranges; and executing the query with the derived local subquery predicates to retrieve data.

Provided is a computer program product for efficient subquery predicate generation to reduce processing in a multi-table join. The computer program product comprises a computer readable storage medium having program code embodied therewith, the program code executable by at least one processor to perform: determining that a query is to be rewritten, where the query includes a predicate for a first column of a first table and a second column of a second table; rewriting the query with generated subquery predicates for the first table that are to be applied to the second table and with generated subquery predicates for the second table that are to be applied to the first table;

determining minimum and maximum ranges for columns of the generated subquery predicates at a cursor open; merging the minimum and maximum ranges to determine inclusive ranges that exist in the first table and the second table; rewriting the generated subquery predicates as derived local subquery predicates with the inclusive ranges; and executing the query with the derived local subquery predicates to retrieve data.

Provided is a computer system for efficient subquery predicate generation to reduce processing in a multi-table join. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: determining that a query is to be rewritten, where the query includes a predicate for a first column of a first table and a second column of a second table; rewriting the query with generated subquery predicates for the first table that are to be applied to the second table and with generated subquery predicates for the second table that are to be applied to the first table; determining minimum and maximum ranges for columns of the generated subquery predicates at a cursor open; merging the minimum and maximum ranges to determine inclusive ranges that exist in the first table and the second table; rewriting the generated subquery predicates as derived local subquery predicates with the inclusive ranges; and executing the query with the derived local subquery predicates to retrieve data.

Such generation of derived local subquery predicates with the inclusive ranges advantageously provides filtering of the data that is to be accessed when the query is executed.

With embodiments, the query is determined to be rewritten based on a condition selected from a group consisting of: 1) database statistics showing mismatched key ranges for column values used for a join between tables of the query, and 2) a finding of one or more local predicates for one or more tables of the query. This advantageously identifies when generation of the derived local subquery predicates is beneficial.

With embodiments, when determining minimum and maximum ranges for columns of the generated subquery predicates, a minimum value for the first table and a maximum value for the first table are retrieved using a first index on the first column for the first table, and a minimum value for the second table and a maximum value for the second table are retrieved using a second index on the second column for the second table. Such retrieval advantageously uses one fetch from the index for each table.

With embodiments, a new query is received with a new predicate for the first table, the second table, and a third table.

With embodiments, the predicate is one of an equi-join predicate and a range-join predicate.

With embodiments, the predicate is for multiple columns.

With embodiments, the second table is a remote table. In such embodiments, the query with the derived local subquery predicates is sent to the remote site to obtain a result.

BRIEF DESCRIPTION OF THE SEVERAL VIEWS OF THE DRAWINGS

Referring now to the drawings in which like reference numbers represent corresponding parts throughout:

FIG. 2A illustrates an initial query for a first example in accordance with certain embodiments.

FIG. 2B illustrates a rewritten query for a first example with generated subquery predicates in accordance with certain embodiments.

FIG. 2C illustrates a rewritten query for a first example with generated subquery predicates after cursor open in accordance with certain embodiments.

FIG. 2D illustrates a rewritten query for a first example with derived local subquery predicates after a merge in accordance with certain embodiments.

FIG. 3A illustrates an initial query for a second example in accordance with certain embodiments.

FIG. 3B illustrates a rewritten query for a second example with generated subquery predicates in accordance with certain embodiments.

FIG. 3C illustrates a rewritten query for a second example with derived local subquery predicates in accordance with certain embodiments.

FIG. 4A illustrates an initial query for a third example in accordance with certain embodiments.

FIG. 4B illustrates a rewritten query for a third example with generated subquery predicates in accordance with certain embodiments.

FIG. 4C illustrates a rewritten query for a third example with generated subquery predicates and values in accordance with certain embodiments.

FIG. 4D illustrates a rewritten query for a third example with derived local subquery predicates in accordance with certain embodiments.

FIG. 5A illustrates an initial query for a fourth example in accordance with certain embodiments.

FIG. 5B illustrates a rewritten query for a fourth example with generated subquery predicates in accordance with certain embodiments.

FIG. 6A illustrates an initial query for a fifth example in accordance with certain embodiments.

FIG. 6B illustrates a rewritten query for a fifth example with generated subquery predicates in accordance with certain embodiments.

FIG. 6C a rewritten query for the fifth example with generated subquery predicates generated for each index in accordance with certain embodiments illustrates.

FIG. 7A illustrates an initial query for a sixth example in accordance with certain embodiments.

FIG. 7B illustrates a rewritten query for a sixth example with generated subquery predicates in accordance with certain embodiments.

FIG. 7C a rewritten query for the sixth example with derived local subquery predicates generated in accordance with certain embodiments illustrates.

FIG. 13 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a lightweight subquery predicate generation approach that may be applied to joins entirely within a local DBMS and also ensures the optimal query is sent to each site in the form of a single query, such as a SQL statement. Embodiments are also applicable to non-SQL statements.

Figure 1:
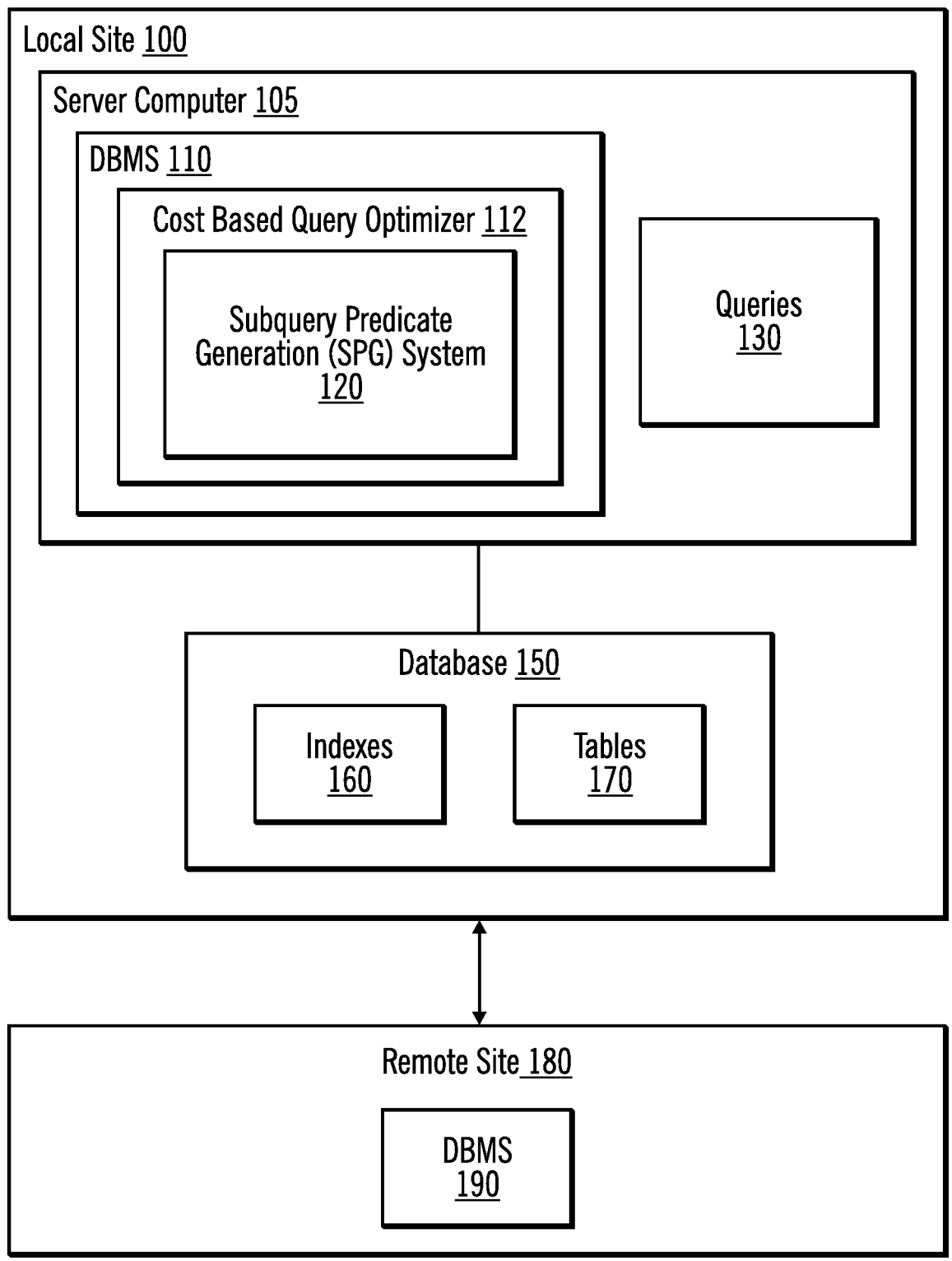
FIG. 1 illustrates, in a block diagram, a computing environment in accordance with certain embodiments.

FIG. 1 illustrates, in a block diagram, a computing environment in accordance with certain embodiments. A local site 100 is coupled to a remote site 180. The remote site 180 may have the same components as the local site 100 as described with reference to FIG. 1. For example, the remote site 180 includes a DBMS 190, which may execute at a remote server computer.

At a local site 100, a server computer 105 is coupled to a database 150. The server computer 105 includes a DataBase Management System (DBMS) 110 and queries 130. The DBMS 110 includes a Subquery Predicate Generation (SPG) system 120. The queries 130 may be SQL statements. The database 150 includes indexes 160 and tables 170.

In a query involving multi-table joins, if 1) the database statistics indicate that there are mismatched key ranges for column values used for the joins between the tables or 2) there are one or more local predicates on one or more tables, then the SPG system 120 generates efficient non-correlated subquery predicates to be transposed to an opposing table of a join. With embodiments, these subquery predicates represent the high and low ranges of one table to be applied to the other table and exploit an efficient index lookup such that the minimum and/or maximum key values may be returned in a single index probe that may also take advantage of available local subquery predicates on that table.

Given the example of FIGS. 2B and 2C, table T1 column C1 has a low value of 1 and a high value of 100, and table T2 column C1 has a low of 50 and a high of 150. Database statistics collected on each table may also indicate this information. In this case, the database statistics collected on these two tables (table T1 and table T2) indicate that there are mismatched key ranges for column values for column C1 (i.e., column values of 1-100 on table T1, and column values of 50-150 on table T2).

Local predicates refer to predicates that are "local" to one table only, such as T1.C2='A', which refers only to table T1, and T2.C3='B', which refers only to table T2. FIG. 3A also provides an example of join predicates T1.C1=T2.C1, and these are not local to one table, and instead represent the join relationship between the two tables (table T1 and table T2). The derived subquery predicates are shown in FIG. 3B. Also, FIG. 2D illustrates local predicates that are derived from the generated subquery predicates.

With embodiments, where the joined table or existing subquery table references a remote table, then the generated subquery predicates are resolved at a cursor open at the local site such that the derived local subquery predicate values may then be applied to the remote table. Cursor open (or "open cursor") is used to describe the first operation in processing at query execution time. Therefore, the remote site sees the derived local subquery predicates, rather than the generated subquery, as the subquery table may not exist on the remote site, or, if the table does exist at the remote site, the SPG system 120 of the local cost based query optimizer cannot assume that an efficient access path exists on the remote site to process the generated subquery predicates.

Embodiments provide efficiency by not reading the full result to derive the high and low subquery predicates. With embodiments, the chosen access plan results in improved performance (e.g., if the plan was not the most optimal table join sequence). For remote objects, performance is improved if fewer rows are returned back to be joined to the local table. Thus, embodiments reduce the requirement to distribute the local table to the remote location for the join to be performed.

FIG. 2A illustrates an initial query 200 for a first example in accordance with certain embodiments. Query 200 uses a two table join. In particular, query 200 joins table T1 and table T2, where column 1 of table T1 (T1.C1) has the same value as column 1 of table T2 (T2.C1). The SPG system 120 generates the low/high key ranges for table T2 to be applied to table T1, and also generates the low/high key ranges for table T1 to be applied to table T2. Then, the SPG system 120 rewrites query 200 as query 210. FIG. 2B illustrates rewritten query 210 for the first example with generated subquery predicates in accordance with certain embodiments.

With embodiments, while it may appear that the rewritten query 210 has increased in complexity, the performance benefit may be large. In certain embodiments, there are also scenarios in which such subquery predicates are likely to increase the cost of the query and may not be used.

If table T2 has an index on column C1, then the following subquery predicates against table T2 each retrieve their minimum (MIN) value or maximum (MAX) value in one fetch from the index. With embodiments, the minimum of column C1 is the 1st entry in the index, and the maximum of column C1 is the last entry in the index. This results in the following generated subquery predicates of query 210:

AND T1.C1>=(SELECT MIN(C1) FROM T2)
AND T1.C1<=(SELECT MAX(C1) FROM T2)

Similarly, if table T1 has an index on column C1, then the following subquery predicates against table T1 each retrieve their minimum value (MIN) value or maximum value (MAX) in one fetch from the index. With embodiments, the minimum of column C1 is the 1st entry in the index, and the maximum of column C1 is the last entry in the index. This results in the following generated subquery predicates of query 210:

AND T2.C1>=(SELECT MIN(C1) FROM T1)
AND T2.C1<=(SELECT MAX(C1) FROM T1)

At query execution time, with the first operation in processing, the generated subquery predicates are resolved to identify actual minimum and maximum values, and the minimum and maximum of the subquery predicates are replaced with the result values. The DBMS 110 processes these types of non-correlated subquery predicates if coded in the query. With embodiments, the SPG system 120 uses the generated subquery predicates if they can be applied before a join operation.

With reference to query 210, the minimum from table T2 returns 50, and the maximum from table T2 returns 150. Also, the minimum from table T1 is 1, and the maximum from table T1 is 100. Thus, after the cursor open processing, SPG system 120 rewrites query 210 with values for the generated subquery predicates to generate query 220. FIG. 2C illustrates rewritten query 220 for the first example with generated subquery predicates after cursor open in accordance with certain embodiments.

After evaluating the generated subquery predicates at a cursor open, the SPG system 120 merges the subquery predicate results of query 220, further restricting the range and to generate query 230 such that only the inclusive ranges exist in the subquery predicates. Thus, the highest value of the "C1>=" subquery predicates is 50, and the lowest of the "C1<=" subquery predicate is 100. FIG. 2D illustrates rewritten query 230 for the first example with derived local subquery predicates after the merge in accordance with certain embodiments. That is, the generated subquery predicates may be referred to as derived local subquery predicates after the merge.

Now, the DBMS 110 accesses column C1 values between 50 and 100 in tables T1 and T2 and then performs a join between tables T1 and T2. This avoids the DBMS 110 accessing all values of column C1 in tables T1 and T2. Depending on the actual join techniques chosen by the SPG system 120, some subquery predicates may be identified as redundant and thus not evaluated at execution time. Given the order of execution for each plan operation of a chosen access path, the SPG system 120 may determine the benefit to keeping the subquery predicates.

For a hash join, a sort-merge join or a nested loop join with a sparse index on the inner table, where the inner table is typically read independently before the outer table, the SPG system 120 may generate these subquery predicates to be applied to the inner table before the materialization. Materialization may be described as processing the full qualified result and being written to an intermediate storage area (such as in-memory or on disk) before the next plan operation of the query is processed. The SPG system 120 may use predicate values generated from the materialization to further refine the filtering in the plan operations.

For a nested loop join or a hybrid join, where there is no materialization (sort or hashing) of the inner table, then only the predicates on the outer table remain to be applied at execution time after the first operation of cursor open that allowed the key ranges to be resolved.

If the column C1 is defined as NULLable, then the clause "WHERE C1 IS NOT NULL" is added to either the minimum or maximum subquery to ensure the first non-NULL value is returned, depending on how NULL is stored in the database. In certain embodiments, for the DBMS 110, NULL is prefixed with hexadecimal x'FF', and thus will be the highest (maximum) value if it exists. Therefore, an IS NOT NULL predicate is added to the maximum (MAX) subquery predicate to ensure the maximum non-NULL value is returned.

Given the example of FIGS. 2A-2D, if there is no index on column C1 to support the efficient subquery execution, then the SPG system 120 does not generate the subquery predicates against that table. With embodiments, if the statistics show that the low/high values for T1.C1 and T2.C1 are similar, then the SPG system 120 may not generate the subquery predicates.

If local predicates also exist in the query in its initial form, then the SPG system 120 may include these local subquery predicates, assuming there is a supporting index.

FIG. 3A illustrates an initial query for a second example in accordance with certain embodiments. Query 300 uses a two table join. In particular, query 300 joins table T1 and table T2, where column 1 of table T1 (T1.C1) has the same value as column 1 of table T2 (T2.C1), column 2 of table T1 (T1.C2) has a value of "A", and column 3 of table 2 (T2.C3) has a value of "B".

The SPG system 120 generates the low/high key ranges for table T2 to be applied to table T1, and also generates the low/high key ranges for table T1 to be applied to table T2. Then, the SPG system 120 rewrites query 300 as query 310. FIG. 3B illustrates a rewritten query 310 for the second example with generated subquery predicates in accordance with certain embodiments.

If an index on table T1 columns C2, C1 exists, then the SPG system 120 employs one fetch access to table T1 using such an index to retrieve the minimum and maximum values for column C1 that also include the local filtering from column C2. Similarly, if an index on table T2 exists on columns C3, C1, then the SPG system 120 employs one fetch access to table T2 using such an index to retrieve the minimum and maximum values for column C1 that also include the local filtering from column C3. Therefore, embodiments provide an efficient way to retrieve the minimum and maximum values that combine both the local filtering provided by the query and the existing data values in the table for the join column(s).

If the index (or indexes) do not support one fetch access, then the behavior depends on the decision of the SPG system 120 given the access path chosen. For example, if an index exists on T1 for columns C1, C2 (or any other combination where C1 is the leading column and C2 is a trailing column), then the SPG system 120 decides how much of the index to read at a cursor open time based upon the access plan chosen or execution performance for the plan operations of the query. These subquery predicates are used to accurately provide an upper and lower bound that is equal to or outside the actual range, and, thus, there is no need to continue to process the subquery predicate until an exact match is found.

The SPG system 120 may still use such an index on table T1 (leading with column C1) to exploit one fetch to efficiently retrieve the minimum and maximum values without the benefit of the column C2 filtering. Similar to query 200, the SPG system 120 may intersect these minimum and maximum values across tables (if subquery predicates are generated for all tables) to narrow the range further. For this second example, as for the first example, this results in a low of 50 and high of 100 for column C1.

With embodiments, if the SPG system 120 determines that there is a benefit to continue to scan the index to obtain the minimum and maximum values, then these resolved values for the lowest level subquery predicate (from the first one fetch access) become the starting point for the subquery predicate exploiting the index on columns C1, C2. From the starting position of C1>=50, the SPG system 120 may scan the index forward to find the first entry with C2='A'. FIG. 3C illustrates a rewritten query 320 for the second example with derived local subquery predicates in accordance with certain embodiments.

How far the SPG system 120 should scan to find the first qualified row depends on what the SPG system 120 has chosen to access the outer query block access to table T1, and also, the efficiency of the access for other parts of the query plan. An efficient query with matching index access for other plan operations may not tolerate scanning an index as part of the subquery predicate due to performance regression associated with this additional processing.

If the outer plan operations are utilizing the same index used in the subquery predicate, then there is likely to be a benefit from continuing to scan within the subquery predicate to find the minimum and maximum values so that they can be used to limit the size of the result that is processed by the outer query block.

Embodiments are also applicable to multi-table joins such as that in the third example. FIG. 4A illustrates an initial query 400 for a third example in accordance with certain embodiments. FIG. 4B illustrates a rewritten query 410 for the third example with generated subquery predicates in accordance with certain embodiments.

With embodiments, the subquery predicates from query 400 may be executed in stages, with evaluated subquery predicates propagated to the next subquery predicate execution to continually reduce the scope of the range. For example, if the column C1 subquery predicate results return 1 to 100 and 50 to 150, then these ranges are merged to 50 to 100. Also, column C2 ranges may return 'A' to 'X' and 'B' to 'Y', and these ranges are merged to 'B' to 'X'. A further execution of the subquery predicates may include the ranges generated from the first pass of all subquery predicates, to be applied to any subquery predicate involving T2, since this is the only table that includes both C1 and C2 columns. FIG. 4C illustrates a rewritten query 420 for the third example with generated subquery predicates and values in accordance with certain embodiments.

FIG. 4D illustrates a rewritten query 430 for the third example with derived local subquery predicates in accordance with certain embodiments.

The SPG system 120 determines the cost benefit of executing the subquery predicates to further refine the key ranges. With embodiments, if the cost to execute the subquery predicates reduces the cost of other plan operations such that the overall cost of execution is reduced, then the SPG system 120 recommends the subquery predicates in an access plan.

The first, second, and third examples involve equi-join subquery predicates that use an equal operator ("=") (e.g., T1.C1=T2.C1). Embodiments also apply to range join subquery predicates that use range operators: <, <=, >, >=, BETWEEN, and LIKE.

FIG. 5A illustrates an initial query 500 for a fourth example in accordance with certain embodiments. Query 500 demonstrates a range join predicate (T1.C1<T2.C1).

FIG. 5B illustrates a rewritten query 510 for the fourth example with generated subquery predicates in accordance with certain embodiments.

The first, second, third, and fourth examples involve single column join predicates for each individual join relationship. Embodiments also apply to multi-column join predicates.

FIG. 6A illustrates an initial query 600 for a fifth example in accordance with certain embodiments. Query 600 demonstrates a multi-column join predicate (T4.C1=T5.C1 AND T4.C2=T5.C2). Multi-column join predicates introduce numerous combinations of subquery predicates that may be used for filtering, depending on available indexing, the statistical low and high values, and also other available filtering. If indexing is available on columns C1, C2 on each table T4 and T5, then the SPG system 120 may produce the low and high ranges for the generated subquery predicates of query 610. FIG. 6B illustrates a rewritten query 610 for the fifth example with generated subquery predicates in accordance with certain embodiments.

For simplicity, only the predicates for table T4 (with related subquery predicates against table T5) are shown for query 610. Similar subquery predicates apply to table T5 (with subquery predicates against T4).

With embodiments, if the index is instead available on columns C2, C1 (rather than C1, C2), then the SPG system 120 generates all references of the generated subquery predicates in query 610 to match the index column sequence to ensure that an index one fetch operation returns the first maximum and minimum row efficiently.

If there only exist single column indexes, separately on column C1 and another on column C2, then the SPG system 120 may generate subquery predicates for each index. FIG. 6C a rewritten query 620 for the fifth example with generated subquery predicates generated for each index in accordance with certain embodiments illustrates.

Embodiments are also applicable for joins to tables that are stored at different/remote locations, such as joining a local DBMS 110 at a local site to a table on a separate query accelerator at a remote site, to a table in a cloud at a remote site, or to a big data platform distributed file system object at a remote site.

FIG. 7A illustrates an initial query 700 for a sixth example in accordance with certain embodiments. Query 700 demonstrates joining a local DBMS 110 table T1 (LOCALTABLE) with a remote table T2 in a cloud (CLOUDTABLE).

For query 700, it is only possible to generate and execute subquery predicates that exist locally, however, the result of the subquery predicates may be applied to remote objects. FIG. 7B illustrates a rewritten query 710 for a sixth example with generated subquery predicates in accordance with certain embodiments. In FIG. 7B, because there is access to the local table T1, the SPG system 120 obtains the minimum and maximum values for the local table T1 to be applied at the remote table T2. In certain embodiments, the minimum and maximum values for the remote table T2 are not available, and so there are no generated subquery predicates for the local table T1.

At a cursor open, the subquery predicates are resolved and ranges of column C1 on LOCALTABLE are 1 to 100. FIG. 7C a rewritten query 720 for the sixth example with derived local subquery predicates generated in accordance with certain embodiments illustrates. These subquery predicates are sent to the remote site to be applied as local predicates against that remote table. In FIG. 7C, the local portion of the original query is executed against the local table T1 (without any derived local subquery predicates for table T1), while the remote portion of the query with the derived local subquery predicates is executed against the remote table T2. Then, the SPG system 120 merges these results (against table T1 and table T2) to generate a final result.

For remote objects, the SPG system 120 resolves the generated subquery predicates at the local site, such that derived local subquery predicate values may be applied to the remote table. Thus, the remote site sees the derived local subquery predicates, rather than the generated subquery predicates. This is because the subquery table may not exist on the remote site; or, if the table does exist, the SPG system 120 of the local cost based query optimizer cannot assume that an efficient access path exists on the remote site to process the subquery predicates.

The first-sixth examples demonstrate predicates generated as subquery predicates and exploiting an index one fetch to return those low/high values. If a DBMS 110 automatically tracks the low/high values for a table, then these may be exploited without fetching from the index. However, for combinations of local and join predicates, then probing the index supplements the tracking of the individual column low/high values.

The first-sixth examples reference single query block queries. Embodiments also apply to queries with nested table expressions or views that are joined, and/or subquery predicates that are coded in the originating query. Since subquery predicates or nested table expressions have similarities to joins to base tables, then the generation of subquery predicates equally applies. The dependency of applying the subquery predicates, and whether there is an opportunity to recursively generate new filtering from each query block and plan operation depends on the sequence of execution for the given access plan chosen by the cost based optimizer.

Thus, embodiments apply to multi-table joins, where subquery predicate execution iterates recursively. Embodiments apply to multi-column join predicates (e.g., ORDER BY and FETCH FIRST 1 ROW in the subquery predicate rather than the max/min values. Embodiments build subquery predicates to match indexes. If indexes are not available for all columns, then the subquery predicates may contain a subset of local/join predicates. Embodiments use the ordering property of indexes to "early out" once the maximum or minimum is found (to avoid scanning more of the index than is needed).

Figure 8A:
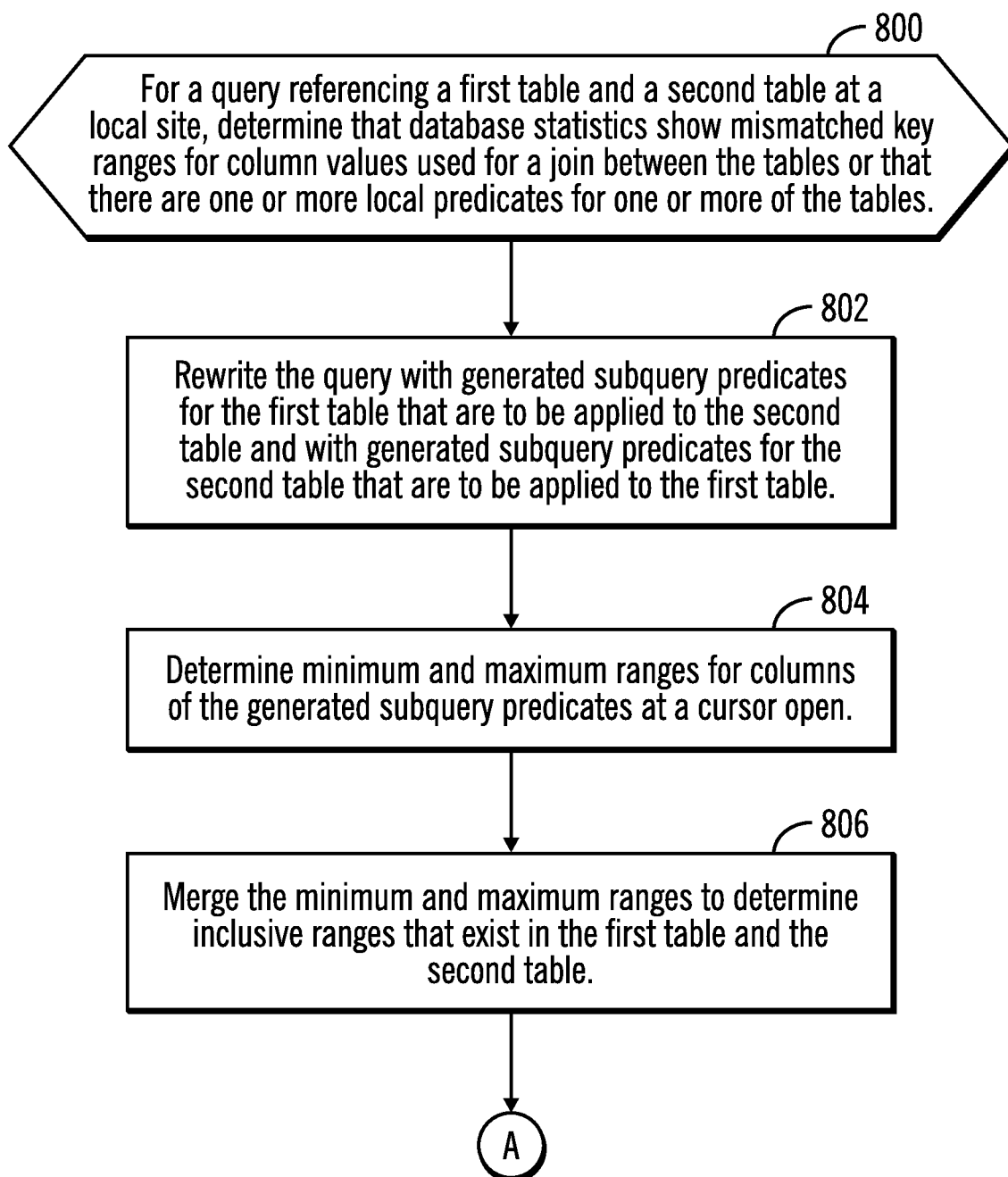
FIGS. 8A and 8B illustrate, in a flow chart, operations for rewriting a query referencing tables at a local site in accordance with certain embodiments.
Figure 8B:
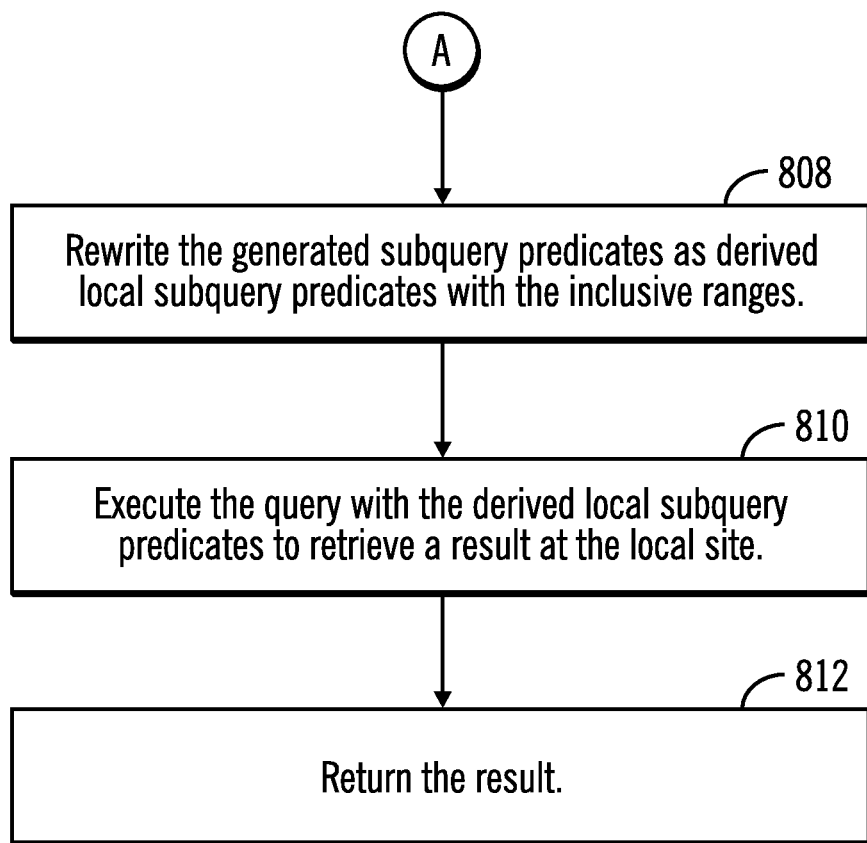

FIGS. 8A and 8B illustrate, in a flow chart, operations for rewriting a query referencing tables at a local site in accordance with certain embodiments. Control begins at block 800 with the SPG system 120, for a query referencing a first table and a second table at a local site, determining that database statistics show mismatched key ranges for column values used for a join between the tables or that there are one or more local predicates for one or more of the tables. In block 802, the SPG system 120 rewrites the query with generated subquery predicates for the first table that are to be applied to the second table and with generated subquery predicates for the second table that are to be applied to the first table. The first table and the second table are referenced in the local predicate of the query. In block 804, the SPG system 120 determines minimum and maximum ranges for columns of the generated subquery predicates at a cursor open. In block 806, the SPG system 120 merges the minimum and maximum ranges to determine inclusive ranges that exist in the first table and the second table. From block 806 (FIG. 8A), processing continues to block 808 (FIG. 8B).

In block 808, the SPG system 120 rewrites the generated subquery predicates as derived local subquery predicates with the inclusive ranges. In block 810, the SPG system 120 executes the query with the derived local subquery predicates to retrieve a result at the local site (i.e., a result set or data from the first table and the second table in the database at the local site). In block 812, the SPG system 120 returns the result (in response to the initial query received in block 800 of FIG. 8A).

Figure 9A:
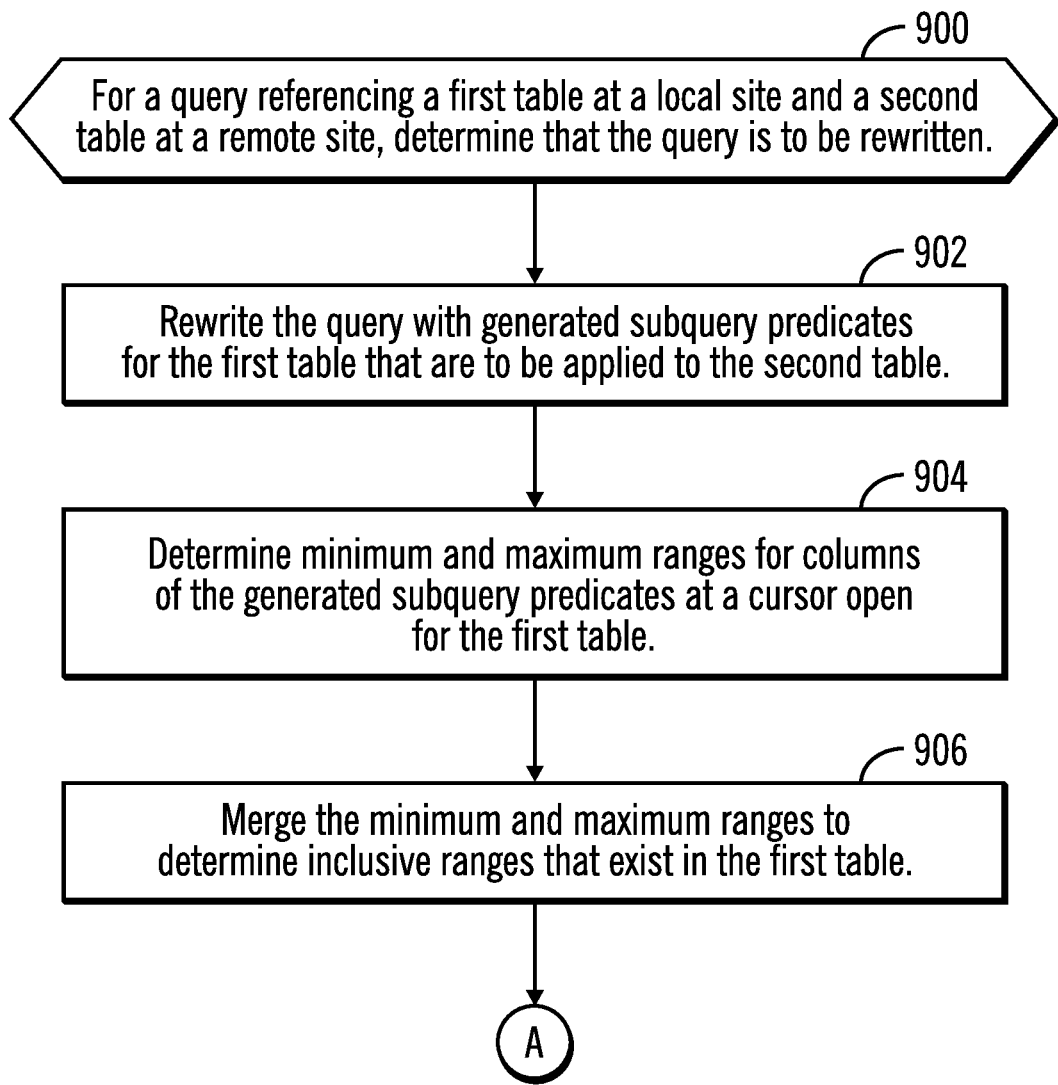
FIGS. 9A and 9B illustrate, in a flow chart, operations for rewriting a query referencing tables at a local site and at a remote site in accordance with certain embodiments.
Figure 9B:
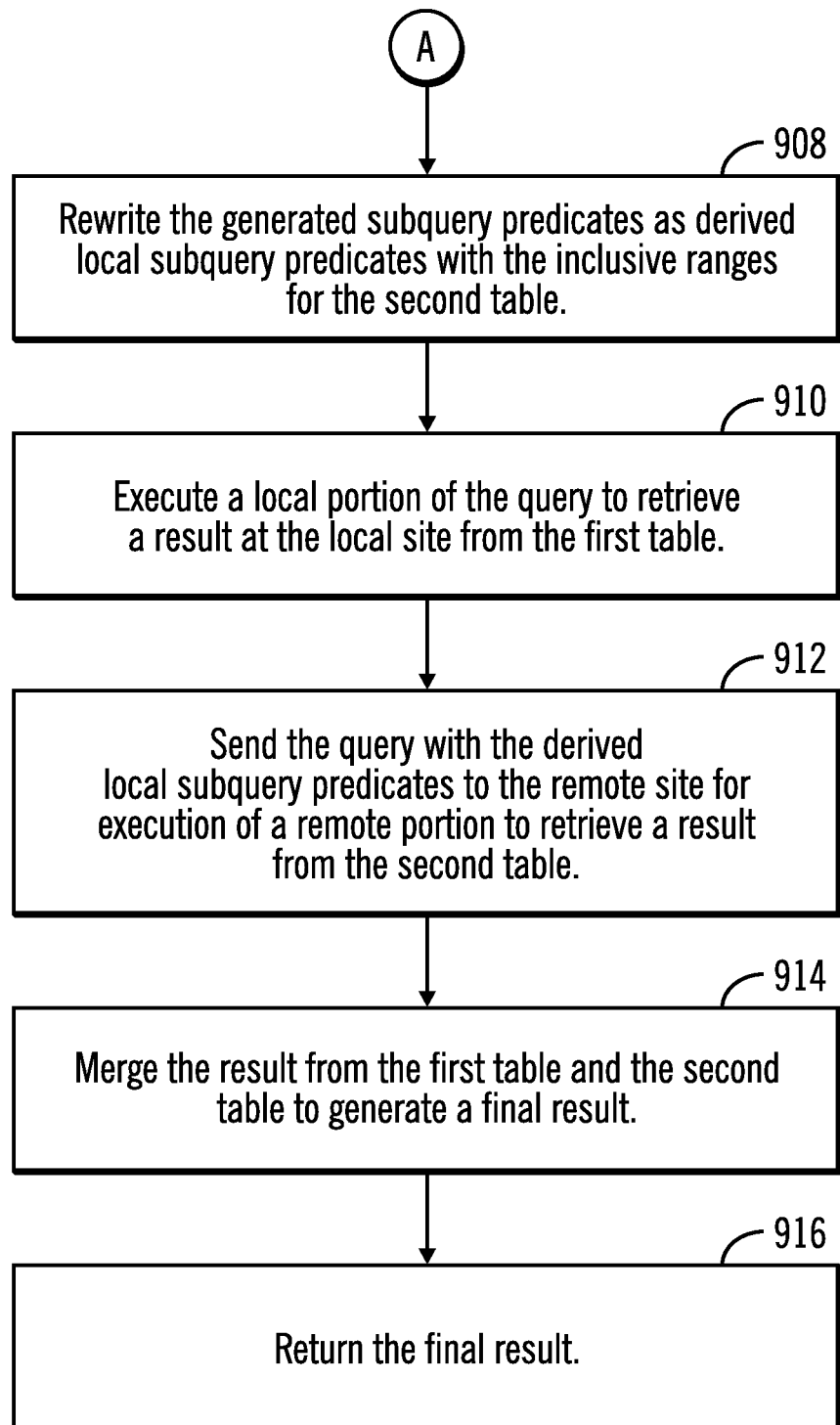

FIGS. 9A and 9B illustrate, in a flow chart, operations for rewriting a query referencing tables at a local site and at a remote site in accordance with certain embodiments. That is, the query references a first table and a second table, with one of these tables at the local site and the other of these tables at the remote site. Control begins at block 900 with the SPG system 120, for a query referencing a first table at a local site and a second table at a remote site, determining that the query is to be rewritten. This determination may be made based on there being a local table and remote table referenced in the query. In block 902, the SPG system 120 rewrites the query with generated subquery predicates for the first table that are to be applied to the second table. Because the SPG system 120 at the local site does not have access to the tables at the remote site, the SPG system 120 is not able to rewrite the query with generated subquery predicates for the second table that are to be applied to the first table. In block 904, the SPG system 120 determines minimum and maximum ranges for columns of the generated subquery predicates at a cursor open for the first table. In block 906, the SPG system 120 merges the minimum and maximum ranges to determine inclusive ranges that exist in the first table. From block 906 (FIG. 9A), processing continues to block 908 (FIG. 9B).

In block 908, the SPG system 120 rewrites the generated subquery predicates as derived local subquery predicates with the inclusive ranges for the second table. In block 910, the SPG system 120 executes a local portion of the query to retrieve a result at the local site from the first table (i.e., a result set or data from the first table in the database at the local site). In block 912, the SPG system 120 sends the query with the derived local subquery predicates to the remote site for execution of a remote portion to retrieve a result from the second table (i.e., a result set or data from the second table in the database at the remote site). In block 914, the SPG system 120 merges the result from the first table and the second table to generate a final result. In block 916, the SPG system 120 returns the final result (in response to the initial query received in block 900 of FIG. 9A).

In certain embodiments, if both the first table and the second table are at the remote site, then, the SPG system 120 at the local site sends the query to the remote site for processing, and the remote site may use another SPG system 120 at that remote site to execute the query as a local query (as with the processing of FIGS. 8A and 8B) and returns the results to the SPG system 120 at the local site.

Figure 10:
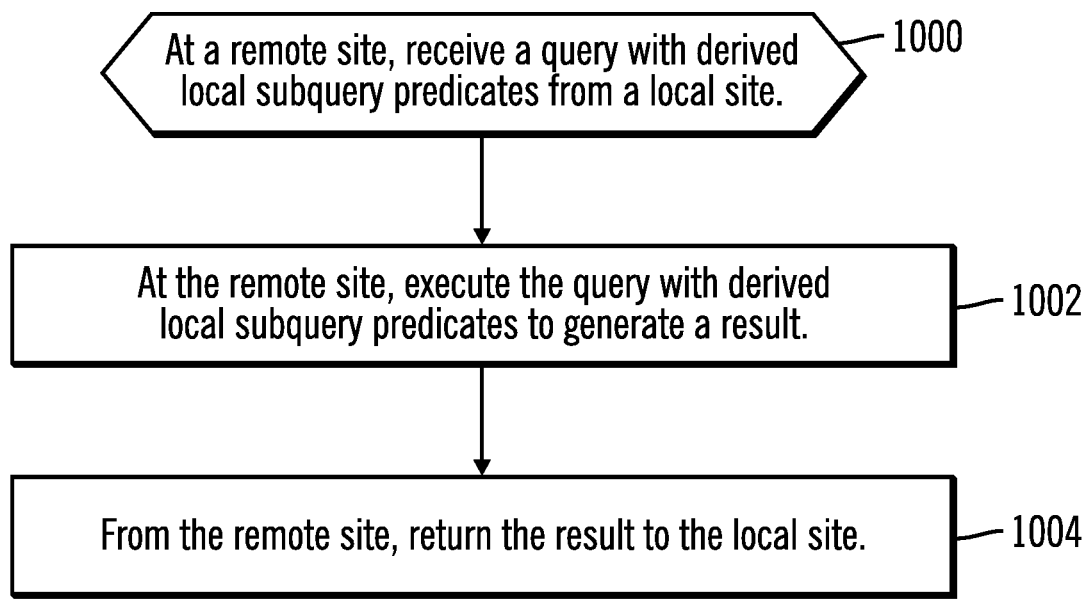
FIG. 10 illustrates, in a flow chart, operations at a remote site in accordance with certain embodiments.

FIG. 10 illustrates, in a flow chart, operations at a remote site in accordance with certain embodiments. Control begins at block 1000 with a remote DBMS 190 at a remote site receiving a query with derived local subquery predicates from the SPG system 120 of the a local site. In block 1002, the remote DBMS 190 executes the query with derived local subquery predicates to generate a result (i.e., data from tables in the database at the remote site). In block 1004, the remote DBMS 190 returns the result to the SPG system 120 of the local site. The remote site may be, for example, a separate query accelerator, a table in a cloud, or a big data platform distributed file system object. The local site may return the result in response to the initial query (e.g., received in block 900 of FIG. 9A).

Thus, with embodiments, for an initial query having a predicate for multiple tables, the multiple tables may be local, and the query with the derived local subquery predicates is executed at the local site to generate results that are returned in response to the initial query.

In other embodiments, for an initial query having a predicate for multiple tables, some of the multiple tables may be local, while the remaining tables are remote. Then, the query with the derived local subquery predicates is executed at the local site for those tables that are local to generate first (local) results, and the query with the derived local subquery predicates is executed at the remote site for those tables that are remote to generate second (remote) results. The SPG system 120 merges the first results and the second results to form results that are returned in response to the initial query.

In yet other embodiments, for an initial query having a predicate for multiple tables, the multiple tables may be remote, and the remote DBMS 190 executes the query with the derived local subquery predicates at the remote site to generate results that are returned in response to the initial query.

Embodiments generate efficient non-correlated subquery predicates: 1) if database statistics show mismatched key ranges on one or more join columns or 2) if there are local predicates on one or more tables. Embodiments generate the efficient non-correlated subquery predicates to be transposed to the opposing table.

Embodiments provide generation of predicates based upon transitive closure without the existence of local subquery predicates.

Embodiments provide the SPG system 120 to enable the cost based query optimizer 110 to choose an efficient access path by applying filtering early in plan generation for optimal performance.

Unlike existing techniques that generate high/low ranges by reading of the data during sort, materialization or hashing, embodiments avoid scanning all of the data, as this is not viable in a transactional query of an enterprise system. For remote objects, embodiments are advantageous in that filtering is done locally and a rewritten query is sent to a remote location without requiring a coordinated cost model between the local and remote sites.

Embodiments generate efficient non-correlated subquery predicates for mismatched key ranges for values of a column used for a join between the first table and the second table. In particular, embodiments generate efficient non-correlated subquery predicates to be transposed to an opposing table, wherein the subquery predicates represent the high and low (maximum or minimum) ranges of one table to be applied to the other table and exploit an efficient index lookup such that the minimum and/or maximum key value can be returned in a single index probe that may also take advantage of available local predicates on that table.

Embodiments may synthesize new predicates not present in a join query nor synthesized by existing art, such as transitive closure. Where applicable, the embodiments may perform inexpensive index lookups to find bounding values from one table that may be applied to reduce scans against another, joined table. Embodiments allow synthesis of subquery predicates where a full data scan is not needed, and requires accessing a trivial amount of data in order to form the new subquery predicates. Where applicable, the potential scan cost savings for the other table may be significant.

Embodiments may be performed using metadata other than index lookups. Such metadata may be found in a synopsis/zone map, where there is not a single probe, but where the metadata is substantially smaller than the potential scan savings. For example, for a small table, the synopsis for a single column might reside on a single page. Another example of such metadata may be a materialized view (a Materialized Query Table (MQT), Automatic Summary Table (AST), etc.), where a synchronously maintained materialized view that matches the query and includes a useful ordering may be probed for a minimum or maximum value.

Unlike existing techniques that use materialization (i.e., a process of reading the full qualified result and storing it in a temporary work area), embodiments provide non-materialized predicate generation by not scanning the full result.

Figure 11:
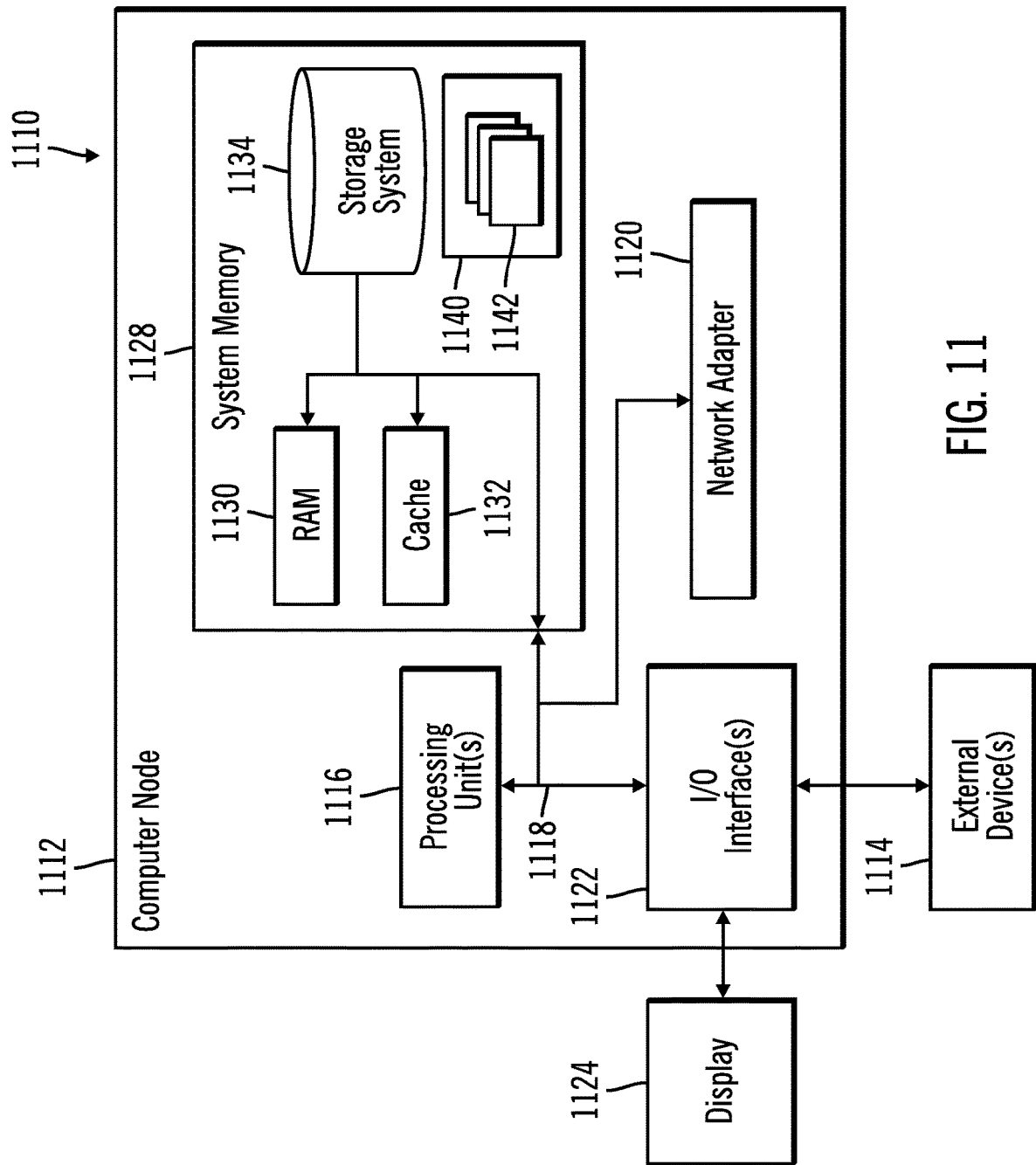
FIG. 11 illustrates a computing node in accordance with certain embodiments.

FIG. 11 illustrates a computing environment 1110 in accordance with certain embodiments. In certain embodiments, the computing environment is a cloud computing environment. Referring to FIG. 11, computer node 1112 is only one example of a suitable computing node and is not intended to suggest any limitation as to the scope of use or functionality of embodiments of the invention described herein. Regardless, computer node 1112 is capable of being implemented and/or performing any of the functionality set forth hereinabove.

The computer node 1112 may be a computer system, which is operational with numerous other general purpose or special purpose computing system environments or configurations. Examples of well-known computing systems, environments, and/or configurations that may be suitable for use with computer node 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1112 may be described in the general context of computer system executable instructions, such as program modules, being executed by a computer system. Generally, program modules may include routines, programs, objects, components, logic, data structures, and so on that perform particular tasks or implement particular abstract data types. Computer node 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer node 1112 is shown in the form of a general-purpose computing device. The components of computer node 1112 may include, but are not limited to, one or more processors or processing units 1116, a system memory 1128, and a bus 1118 that couples various system components including system memory 1128 to one or more processors or processing units 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1112 typically includes a variety of computer system readable media. Such media may be any available media that is accessible by computer node 1112, and it includes both volatile and non-volatile media, removable and non-removable media.

System memory 1128 can include computer system readable media in the form of volatile memory, such as random access memory (RAM) 1130 and/or cache memory 1132. Computer node 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, system memory 1128 may include at least one program product having a set (e.g., at least one) of program modules that are configured to carry out the functions of embodiments of the invention.

Program/utility 1140, having a set (at least one) of program modules 1142, may be stored in system memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer node 1112 may also communicate with one or more external devices 1114 such as a keyboard, a pointing device, a display 1124, etc.; one or more devices that enable a user to interact with computer node 1112; and/or any devices (e.g., network card, modem, etc.) that enable computer node 1112 to communicate with one or more other computing devices. Such communication can occur via Input/Output (I/O) interfaces 1122. Still yet, computer node 1112 can communicate with one or more networks such as a local area network (LAN), a general wide area network (WAN), and/or a public network (e.g., the Internet) via network adapter 1120. As depicted, network adapter 1120 communicates with the other components of computer node 1112 via bus 1118. It should be understood that although not shown, other hardware and/or software components could be used in conjunction with computer node 1112. Examples, include, but are not limited to: microcode, device drivers, redundant processing units, external disk drive arrays, RAID systems, tape drives, and data archival storage systems, etc.

In certain embodiments, the server computer 105 has the architecture of computer node 1112. In certain embodiments, components of the local site 100 and/or the remote site 180 are part of a cloud infrastructure. In certain alternative embodiments, components of the local site 100 and/or the remote site 180 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
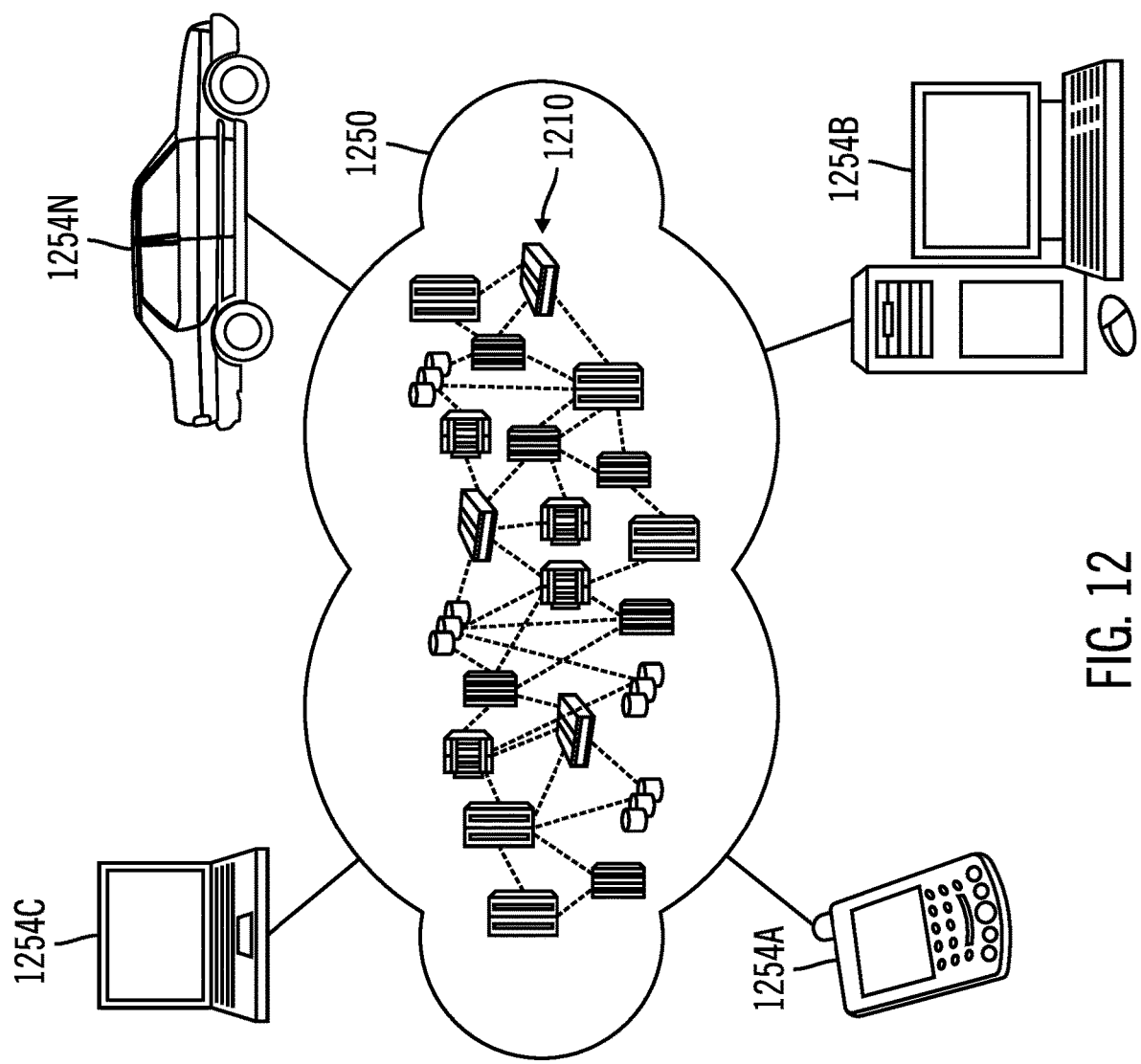
FIG. 12 illustrates a cloud computing environment in accordance with certain embodiments.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and non-materialized predicate generation 1396

Thus, in certain embodiments, software or a program, implementing non-materialized predicate generation in accordance with embodiments described herein, is provided as a service in a cloud environment.

ADDITIONAL EMBODIMENT DETAILS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
   determining that a query is to be rewritten based on database statistics showing mismatched key ranges for column values used for a join between a first table and a second table, wherein the query includes a predicate for a first column of the first table and a second column of the second table, wherein the mismatched key ranges comprise a first range for the first table and a second range for the second table that have a common subset of values, wherein the database statistics are collected for the first table and the second table, and wherein the predicate is one of an equi-join predicate and a range-join predicate;
   generating first subquery predicates for the first table that are to be applied to the second table;
   generating second subquery predicates for the second table that are to be applied to the first table;
   rewriting the query with the first subquery predicates and the second subquery predicates;
   determining the first range with minimum and maximum values for columns of the first subquery predicates and a second range with minimum and maximum values for columns of the second subquery predicates;
   merging the first range and the second range to determine inclusive ranges that exist in the first table and the second table, wherein the inclusive ranges are for the common subset of values;
   rewriting the first subquery predicates and the second subquery predicates as derived local subquery predicates with the inclusive ranges; and
   executing the query with the derived local subquery predicates to retrieve data.

2. The computer-implemented method of claim 1, wherein the query is determined to be rewritten based on a finding of one or more local predicates for one or more tables of the query.

3. The computer-implemented method of claim 1, wherein determining the first range and the second range further comprises operations for:
   retrieving, using a first index on the first column for the first table, a minimum value for the first table and a maximum value for the first table; and
   retrieving, using a second index on the second column for the second table, a minimum value for the second table and a maximum value for the second table.

4. The computer-implemented method of claim 1, further comprising operations for:
   receiving a new query with a new predicate for the first table, the second table, and a third table.

5. The computer-implemented method of claim 1, wherein the predicate is for multiple columns.

6. The computer-implemented method of claim 1, wherein the second table is a remote table.

7. The computer-implemented method of claim 1, wherein a Software as a Service (SaaS) is configured to perform the operations of the computer-implemented method.

* * * * *